(12) United States Patent
Kert et al.

(10) Patent No.: US 8,152,644 B2
(45) Date of Patent: Apr. 10, 2012

(54) DATA STREAM PROCESSING

(75) Inventors: Kaido Kert, Tallinn (EE); Henrique Penha, London (GB)

(73) Assignee: Skype, Dublin (IE)

( * ) Notice: Subject to any disclaimer, the term of this patent is extended or adjusted under 35 U.S.C. 154(b) by 380 days.

(21) Appl. No.: 12/455,446

(22) Filed: Jun. 2, 2009

(65) Prior Publication Data
US 2010/0062857 A1    Mar. 11, 2010

(30) Foreign Application Priority Data

Sep. 9, 2008  (GB) .................................... 0816482.4

(51) Int. Cl.
*A63F 9/24* (2006.01)
(52) U.S. Cl. .......................................................... 463/42
(58) Field of Classification Search ...................... 463/42
See application file for complete search history.

(56) References Cited

U.S. PATENT DOCUMENTS

| | | | |
|---|---|---|---|
| 6,529,875 B1 * | 3/2003 | Nakajima et al. | 704/275 |
| 2005/0181872 A1 | 8/2005 | Acharya et al. | |
| 2007/0033625 A1 | 2/2007 | Chiu | |
| 2007/0078000 A1 | 4/2007 | Saund et al. | |
| 2008/0172243 A1 * | 7/2008 | Kelly | 705/1 |

FOREIGN PATENT DOCUMENTS

| | | |
|---|---|---|
| EP | 1 876 789 A2 | 1/2008 |
| GB | 2 428 536 A | 1/2007 |
| WO | WO 2005/009019 A2 | 1/2005 |
| WO | WO 2006/090202 A1 | 8/2006 |
| WO | WO 2006/108366 A1 | 10/2006 |
| WO | WO 2009/086011 A1 | 7/2009 |

OTHER PUBLICATIONS

Search Report from PCT/EP2009/061495, date of mailing Sep. 14, 2010.
Search Report from Application No. GB0816482.4, Dated: Jan. 4, 2010.

* cited by examiner

*Primary Examiner* — Fernando L Toledo
(74) *Attorney, Agent, or Firm* — Hamilton, Brook, Smith & Reynolds, P.C.

(57) ABSTRACT

A method for outputting data streams in a communication system, the method comprising the steps of:
  executing an electronic game application at a user terminal, the game application being programmed to allow two or more users of the communication system to participate in the game;
  receiving two or more data streams at the user terminal, each data stream being generated by a user of the communications system participating in the game;
  applying game logic to determine the current state of the game application; and
  selecting one or more of the received data streams to be output from an output device of the user terminal, wherein the selection depends on the current state of the game application.

11 Claims, 3 Drawing Sheets

DATA STREAM PROCESSING

RELATED APPLICATION

This application claims priority under 35 U.S.C. §119 or 365 to Great Britain Application No. 0816482.4, filed Sep. 9, 2008. The entire teachings of the above application are incorporated herein by reference.

FIELD OF THE INVENTION

The present invention relates to the processing of data streams in a communication system, and in particular to the processing of data streams produced by players during participation in an electronic game.

BACKGROUND OF THE INVENTION

Voice over internet protocol ("VoIP") communication systems allow the user of a terminal, such as a personal computer, to make telephone calls across a computer network such as the Internet. These systems are beneficial to the user as they are often of significantly lower cost than traditional telephony networks, such as fixed line or mobile networks. This may particularly be the case for long distance calls. To use a VoIP service, the user must install and execute client software on their terminal. The client software provides the VoIP connections as well as other functions such as registration and authentication. In addition to voice communication, the client may also provide video calling and instant messaging ("IM").

One type of VoIP communication system uses a peer-to-peer communication system built on proprietary protocols. To access the peer-to-peer communication system, the user must execute peer to peer client software provided by the operator of the peer to peer system on their user terminal, and register with the peer to peer system. When the user registers with the peer to peer system the client software is provided with a digital certificate from a central server. Once the client software has been provided with the certificate, communication can subsequently be set up and routed between users of the peer to peer system without the further use of a central server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a peer to system are disclosed in WO 2005/009019.

In a communication system, such as a peer to peer system, the client software installed on an end user terminal such as a personal computer (PC) allows the user of the user terminal to communicate with other users of the communication system. The user interface of the client software can be controlled to display details of other users of the communication system as a list of contacts stored by the user of the user terminal. The client user interface may also be controlled to display a list of recent events such as missed incoming calls or chat messages The user may navigate options presented by the client user interface in order to access the contact list and initiate a communication event with user of the communication network listed in the contact list. Alternatively the user may access the list of recent events by selecting an event history option in order to return a missed call or access a chat message.

Computer gaming systems form an integral part of many peoples' home entertainment systems. Gaming systems typically allow users to play a wide variety of games by loading and executing the appropriate software. The software creates a virtual game word representing, for example, virtual reality in which the player can control one or more game characters. The player interacts with the game by means of various input devices such as control pads and a keyboard, and various output devices such as a monitor and speakers.

The enjoyment of many games may be enhanced by allowing two or more players to play a game simultaneously, for example to compete against each other in the game. If all players are located at the same place then each player may control a respective input device connected to the same game machine which runs the game software. In some cases, it is also possible for multiple players to participate together in a game when they are located remotely from each other. In this case, each player has a respective game machine which communicate with each other via a network such as the internet. Each game machine executes the game software and receives input signals from the input devices controlled by a respective player. These signals are transmitted over the network to one of the game machines designated as a master. The master receives the inputs and modifies the state of the game world accordingly. The master then transmits signals back to each of the other game machines representing the modified game state. The modified game state is updated in each of the game machines and displayed to the players.

In accordance with a first aspect, the invention provides a method for outputting data streams in a communication system, the method comprising the steps of: executing an electronic game application at a user terminal, the game application being programmed to allow two or more users of the communication system to participate in the game; receiving two or more data streams at the user terminal, each data stream being generated by a user of the communications system; applying game logic to determine the current state of the game application; and selecting one or more of the received data streams to be output from an output device of the user terminal, wherein the selection depends on the current state of the game application.

In accordance with a second aspect, the invention provides a system for outputting data streams in a communication system, the system comprising: a processor for executing an electronic game application at a user terminal, the game application being programmed to allow two or more users of the communication system to participate in the game; an input for receiving two or more data streams at the user terminal, each data stream being generated by a user of the communications system; means for applying game logic to determine the current state of the game application; and means for selecting one or more of the received data streams to be output from an output device of the user terminal, wherein the selection depends on the current state of the game application.

BRIEF DESCRIPTION OF DRAWINGS

For a better understanding of the present invention and as to how the same may be carried into effect, embodiments of the present invention will now be described with reference to the following drawings.

DETAILED DESCRIPTION

Figure 1:
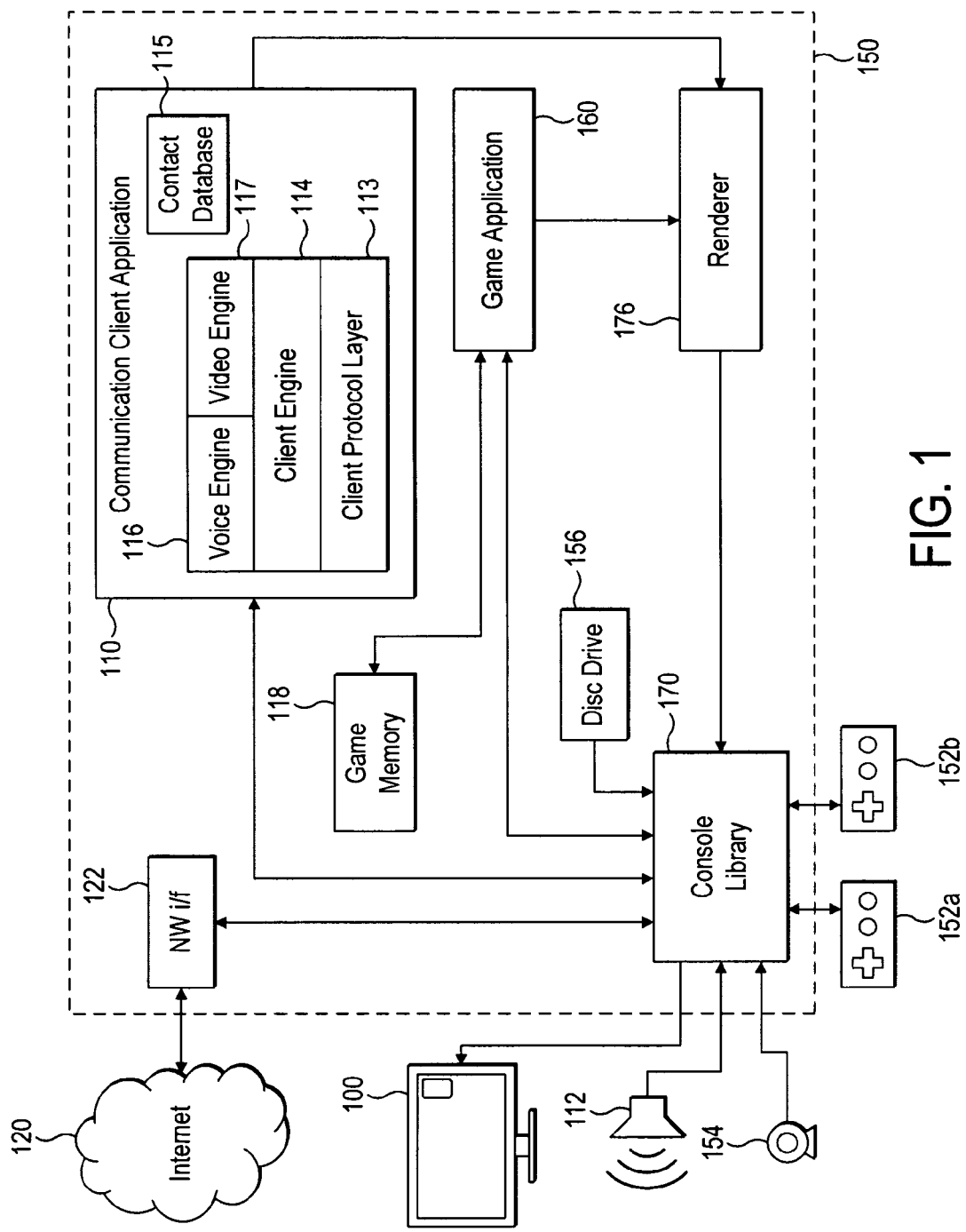
FIG. 1 shows a schematic block diagram of an electronic gaming system.

The inventors have recognized the potential for combining otherwise diverse techniques together with a computer game to improve the degree of interaction of a remote user: that is, to incorporate a communication client into a games system to allow a player of a game to call friends while they are playing games, especially those participating in the game via the internet.

Packet-based communication systems allow the user of a terminal to communicate across a computer network such as the Internet. Packet-based communication systems include voice over internet protocol ("VoIP") or video-over-IP communication systems. These systems are beneficial to the user as they are often of significantly lower cost than fixed line or mobile networks. This may particularly be the case for long-distance communication. To use a VoIP or video-over-IP system, the user must execute client software on their device. The client software provides the voice and video IP connections as well as other functions such as registration and authentication. In addition to voice and video communication, the client may also provide further features such as instant messaging ("IM" or "chat" messaging), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their terminal, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A communication client is embedded into a games system so as to enable a user to make live, packet-based calls from the games system. The client application is in the form of software stored in a memory and arranged for execution on a central processing unit (CPU), the memory and CPU being parts of the games system integrated together into a single household appliance, and hence sold together as a single product, in a single casing optionally with external peripherals such as game controllers. The game system product is preferably a "dedicated" or specialized games console, meaning at least that it has a default mode of operation as a games system.

Reference is now made to FIG. 1, which is a schematic block diagram showing functional blocks of a games system 150 and connected peripherals. The games system 150 comprises a network interface 122 for connecting to the Internet 120. This network interface could be a built-in modem, or a wired or wireless interface connected to an external modem. The games console also comprises a storage reader, preferably a storage module reader with storage module receptacle for receiving and reading removable storage modules. The storage module reader is preferably in the form of a disc drive 156 for reading CDs, DVDs and/or other types of optical disc received via an appropriate slot or tray.

The game system 150 further comprises a console library 170, a game application 160, and a communication client application 110. Each of these blocks are preferably software elements stored on a memory and arranged to be executed on a processing apparatus of the games system 150. The processing apparatus (not shown) comprises at least one central processing unit (CPUs), and may comprise more than one CPU for example in an arrangement of a host CPU and one or more dedicated digital signal processors (DSPs) or a multi-core arrangement. The memory (also not shown) may be of a number of different types and the above software elements may be stored in the same memory or in different memories of the same or different types. For example, the communication client 110 may be installed on an internal hard-drive or flash memory of the games system 150, and the game application 160 may be stored on an optical disc and loaded via the disc drive 156 for execution. Alternatively, the game application could be copied from the optical disc onto the hard drive or flash memory of the game system 150, or downloaded from a server via the network interface 122 and Internet 120. In other embodiments, the client application 110 and/or game application 160 could be stored on an external hard drive or flash memory.

Given the different possible types of memory, note therefore that the game system's storage readers need not necessarily include only a storage module reader such as an optical disc drive, but could also include the reading mechanism of a hard drive, the read circuitry of a flash memory, or suitable software for accessing a server via the network interface 122.

The console library 170 is a basic system library which takes care of low level functions including input and output functions. The console library 170 is preferably stored on a memory internal to the games system 150, e.g. on a hard drive, flash memory or read-only memory (ROM).

The console library 170 is operatively coupled to the screen of a television set 100 via a television output port (not shown) of the games system 150. The console library is also operatively coupled to a loudspeaker 112, which although shown separately can be housed within the television set 100 and coupled to the console library 170 via the television output port. Alternatively another audio output source could be used such as headphones or a connection to a separate stereo or surround-sound system.

In order to receive user inputs from a local user of the games system 150, the console library 170 is operatively coupled to one or more game controllers 152 via one or more respective controller input ports (not shown) of the games system 150. These could comprise a more traditional arrangement of user controls such as a directional control pad or stick with accompanying buttons, and/or other types of user inputs such as one or more accelerometers and/or light sensors such that physical movement of the controller 152 provides an input from the user. The console library 170 can also be arranged to be able to receive audio inputs from a microphone in the controller 152 (or connected thereto) and provide outputs to a speaker housed in the controller 152, again via the controller port. Alternatively, a separate microphone input could be provided.

Optionally, in order to receive video data from the local user of the games system 150, the console library 170 is operatively coupled to a digital video camera 154, either a webcam or digital camera with video capability, via a camera input port or general purpose input port (not shown).

In order to load game applications or other software, the console library 170 is operatively coupled to the disc drive 156.

Further, the console library 170 is operatively coupled to the network interface 122 so that it can send and receive data via the Internet 120 or other packet-based network.

The console library 170 is operatively coupled to the game application 160, thus enabling inputs and outputs to be communicated between the game application 160 and the various I/O devices such as the TV set 100, loudspeaker 112, controllers 152, microphone 154, disc drive 156 and network interface 122. The console library 170 is also operatively coupled to the client application 110, thus enabling inputs and outputs to be communicated between the client application 110 and the I/O devices such as the TV set 100, loudspeaker 112, controllers 152, video camera 154, disc drive 156 and network interface 122.

The communication client 110 and game application 160 are connected to a renderer 176. The renderer 176 is responsible for rendering graphics for display on the TV set 100. The output of the renderer 176 is provided to the console library 170, such that the rendered graphics are sent for display on the TV set 100.

The game application 160 is operatively coupled to the client application thus enabling data to be transferred between the game application and the client application. For example, this allows the game application retrieve of a list of contacts stored by the client application. This also allows the game application to transmit game character identifiers to the client application to be stored in association with the contact list in the client application. The game application is also operatively coupled to a game memory 118 in which data used by the game application, such as game character identifiers, are stored.

The packet-based communication client 110 embedded in the games system 150 is based around four main elements. Preferably, these four elements are software elements that are stored in memory and executed on a CPU both embedded in the TV 150. The four elements are: a client protocol layer 113, a client engine 114, a voice engine 116, and a video engine 117.

The client engine 114, voice engine 116 and video engine 117 establish and conduct bidirectional, packet-based, point-to-point (including the possibility of point-to-multipoint) communications via a packet based communication network such as the Internet 120; e.g. by establishing a peer-to-peer (P2P) connection over a peer-to-peer network implemented over the Internet 120.

The protocol layer 113 deals with the underlying protocols required for communication over Internet 120.

The client engine 114 is responsible for setting up connections to the packet-based communication system. The client engine 114 performs call set-up, authentication, encryption and connection management, as well as other functions relating to the packet-based communication system such as firewall traversal, presence state updating, and contact list management.

The voice engine 116 is responsible for encoding of voice signals input to the games system 150 as VoIP packet for transmission over the Internet 120 and the decoding of VoIP packets received from the Internet 120 for presentation as audio information to the user of the TV 150. The voice signals may be provided by the local user from a microphone in the controller 152 or separate microphone via the console library 170. The audio output may be output to the loudspeaker 170 via the console library 170.

The video engine 117 is responsible for the encoding of video signals input to the games system 150 as packets for transmission over the internet 120 in a video call, and the decoding of video packets received in a video call for presentation as video images to the TV set 100. The input video signals may be provided by the local user from the video camera 154 via the console library 170. The output video may be output to the TV set 100 via the renderer 176 and the console library 170.

The game application 160 comprises game logic responsible for receiving inputs from users and processing those inputs according to the rules of the game.

Figure 2:
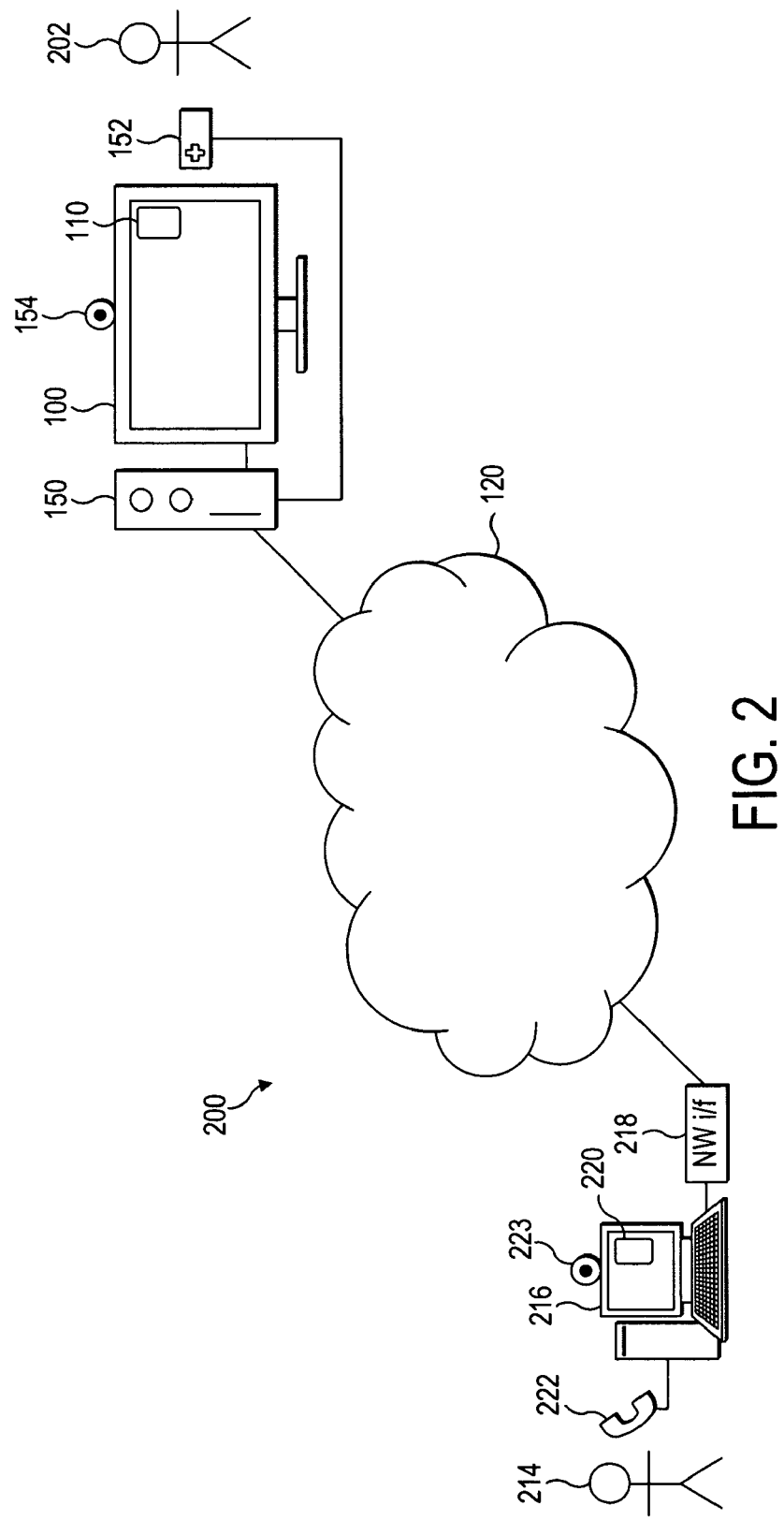
FIG. 2 shows a schematic diagram of a communication system.

In order to describe the operation of the games system 150 with the packet-based communication system, and particularly the operation of the game application 160 with the communication client 110, reference is now made to FIG. 2, which illustrates the use of the games system 150 in a portion of an example system 200.

Note that whilst this illustrative embodiment is described with reference to a P2P communication system, other types of non-P2P communication system could also be used. The system 200 shown in FIG. 2 shows a first user 202 of the communication system operating a TV 100, which is shown connected to a games system 150, which is in turn connected to a network 120. Note that the communication system 200 utilizes a network such as the Internet. The games system 150 is connected to the network 120 via a network interface (not shown) such as a modem, and the connection between the games system 150 and the network interface may be via a cable (wired) connection or a wireless connection.

The games system 150 is executing an embedded communication client 110. The games system 150 is arranged to receive information from and output information to the user 202. A controller 152 acts as the input device operated by the user 202 for the control of the games system 150.

The embedded communication client 110 is arranged to establish and manage voice and video calls made over the packet-based communication system using the network 120. The embedded communication client 110 is also arranged to retrieve information including a list of contacts associated with the user 202. Each contact in the contact list has a user-defined presence status associated with it, and each of these contacts have authorised the user 202 of the client 110 to use their contact details and presence state.

The contact list for the users of the packet-based communication system is stored in a contact server (not shown in FIG. 2). When the client 110 first logs into the communication system the contact server is contacted, and the contact list is downloaded to a contact database portion 115 of the client 110. This allows the user to log into the communication system from any terminal and still access the same contact list. The contact server is also used to store a mood message (a short user-defined text-based status that is shared with all users in the contact list) and a picture selected to represent the user (known as an avatar). This information can be downloaded to the client 110, and allows this information to be consistent for the user when logging on from different terminals. The client 110 also periodically communicates with the contact server in order to obtain any changes to the information on the contacts in the contact list, or to update the stored contact list with any new contacts that have been added.

Also connected to the network 120 is a second user 214. In the illustrative example shown in FIG. 2, the user 214 is operating a user terminal 216 in the form of a personal computer. Note that in alternative embodiments, other types of user terminal can also be connected to the packet-based communication system. In addition to personal computers ("PC") (including, for example, Windows™, Mac OS™ and Linux™ PCs), a personal digital assistant ("PDA"), a mobile phone, or a gaming device could also be connected. In a preferred embodiment of the invention the user terminal 216 comprises a display such as a screen and an input device such as a keyboard, mouse, joystick and/or touch-screen. The user device 216 is connected to the network 120 via a network interface 218 such as a modem.

Note that in alternative embodiments, the user terminal 216 can connect to the communication network 120 via additional intermediate networks not shown in FIG. 2. For example, if the user terminal 216 is a mobile device, then it can connect to the communication network 120 via a mobile network (for example a GSM or UMTS network).

The user terminal 216 is running a communication client 220, provided by the software provider. The communication client 220 is a software program executed on a local processor in the user terminal 216 comprising similar elements to the embedded communication client 110. The communication client 220 enables the user terminal 216 to connect to the packet-based communication system. The user terminal 216 is also connected to a handset 222, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 216, or integrated into the user terminal 216 itself. The user terminal 216 is also connected to a video camera 223, such as a webcam, which enables video images from the user terminal 216 to be sent in a video call.

Presuming that the first user 202 is listed in the contact list of the client 220 presented to second user 214, then the second user 214 can initiate a call to the first user 202 over the communication network 120. Similarly, the first user 202 can initiate a call to the second user 214 over the communication network 120. As described in greater detail below, an incoming call received by the first user from the second user can be handled while the first user is playing a game. Similarly, the first user may initiate a call to the second user while playing the game.

The user 202 can initiate a call in the manner described in greater detail below. The call set-up is performed using proprietary protocols, and the route over the network 120 between the calling user and called user is determined by the peer-to-peer system without the use of servers. Following authentication through the presentation of digital certificates (to prove that the users are genuine subscribers of the communication system—described in more detail in WO 2005/009019), the call can be established.

The user 202 can select to answer an incoming call in the manner described in greater detail below. When the video call is established with the second user 214, voice packets from the user terminal 216 begin to be received at the communication client 110. When the second user 214 talks into handset 222, the client 220 executed on user terminal 216 encodes the audio signals into VoIP packets and transmits them across the network 120 to the games system 150. The VoIP packets are received at the client protocol layer 113 (via the console library), provided to the client engine 114 and passed to the voice engine 116. The voice engine 116 decodes the VoIP packets to produce audio information. The audio information is passed to the console library 170 for output via the speaker 112.

The user 202 is able to utilize the games system 150, and specifically the game application 160 to play a game whilst receiving and initiating calls.

Figure 3:
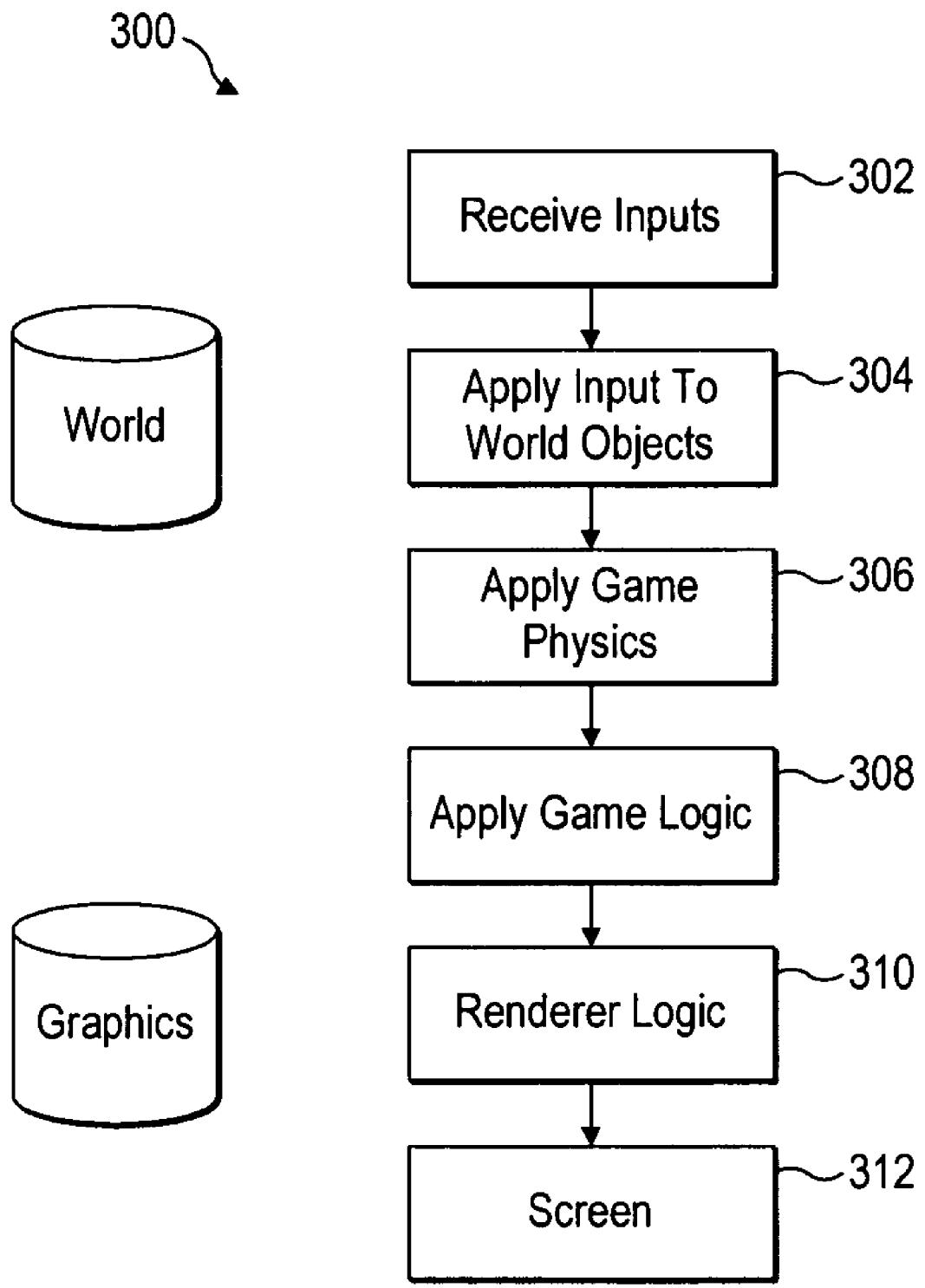
FIG. 3 is flow diagram of a method carried out by the electronic gaming system illustrated in FIG. 1.

FIG. 3 is a flow diagram of a method 300 carried out when the game application software is executed. The game application creates a game world representing the current state of the game. The game world comprises game objects corresponding to conceptual objects in the game, such as game characters, selectable menus within the game, and so on. Some of the game objects, such as game characters may be graphic objects which are controlled by the players. In a first step 302 the executing program receives one or more inputs. These may be, for example, inputs from the input devices controlled by the game players or data from the game memory. In a next step 304 the inputs are applied to the game world. For example, the inputs may be applied to the world objects created by the game software. The inputs dictate how the game objects react, move or behave, or what selections are made. The effect of inputs is determined by the current state of the game so that, for example, certain key presses will have different effects in menus, characters or different game views.

In a next step 306 game physics are applied to the game world. The game physics represent the rules by which objects in the game environment move and interact. For example, the game physics may be based on real-life physics so that the movement and interaction of game objects closely resembles behaviour in the real-world. Alternatively, the game physics may be defined so as to cause objects to behave differently to the real-world. In some games, it may not be necessary to apply game physics. For example, a quiz game would not require the application of game physics.

In a next step 308, game logic is applied. Game logic dictates how the state of the game changes according to the movement and behaviour of game objects and other events occurring in the game. For example, if a game character comes into contact with some other object, the character may be given special properties, gain points, lose a life and the like. In a quiz game, the game logic may determine who pressed a buzzer first and determine that this is the game participant who should answer a question.

In a next step 310, the game environment and objects within it are rendered using render logic. The render logic receives an input from the game logic and the game world and controls what graphics should be written to the frame buffer and output to the screen. Data corresponding to a visual representation of the game environment is generated, and, in a next step 312, the data is provided to the frame buffer resulting in the game environment being displayed to the players.

The above process 300 is repeated until the game terminates.

In multi-player games, each player typically controls a specific game character. In order that characters can be distinguished by the game software so that, for example, each player's control can be applied to the correct game character, each game character is typically associated with a unique character identification. Each game object created by the game application is associated with a unique identity which is stored in the game memory 118 and accessible by the game application. The object identities are used by the game application to distinguish between different objects. The game memory comprises an object database storing the identities of all of the objects in the game environment together with any other associated information. In some game applications, users are given the facility to create their own customized characters. A character may be customized with respect to its appearance, behaviour or other attributes of the character. When a user has created or customized a character, the character is assigned an identification which is stored in the object database in the game memory 118.

In some games, players may be allowed to provide an audible input. For example, in a quiz game, a player may be allowed to answer a question verbally by speaking into a microphone. In multi-player games, each player may speak into their own microphone thereby generating an audio data stream for each player. The game can then use speech recognition software to interpret the answer given. When a game is played by multiple players over the internet, the various data streams are mixed into a single stream that is provided to each game machine so that each player can hear all of the other players. One problem is that when there are multiple players participating in a game in this way, the voices of some players can obscure that of the player whose turn it is to speak. The speech recognition software may then not be able to properly interpret the player's answer.

In this embodiment, data streams such as audio streams and video streams may be transmitted from different players in a multi-player game. The output of each data stream at each games console is controlled according to the state of the game.

In this embodiment, a user launches a game application on the games console by loading and executing the game application software. In the case that the application is a multi-player game, the application provides the capability to allow the user to invite other players to join in the game remotely via the network. For example, the user may be allowed to select one or more contacts from the list of contacts. The contacts may be selected from a menu which displays a list of available contacts. When the menu is opened, the games application 160 requests the list of contacts from the communication client 110. In another example, contacts may be associated with game characters and the user instead selects one or more game characters corresponding to the contacts who are to be invited to participate in the game. The association of game characters and contacts may have been performed by the user previously, in this case the game object identifier of the game character is stored in association with the username of the contact in the contact database 115.

In response to the user selecting players to invite to join a game, the game application 160 transmits the identifications of the selected contacts or game characters to the communication client 110 together with an INVITE instruction. The INVITE instruction indicates that the user wishes to invite the selected contacts, or the contacts associated with the selected characters, to participate in the game. If game characters have been selected then the communication client first identifies which contacts correspond to the selected characters. The communication client is arranged to retrieve contact information for each of the selected contacts from the contact database 115 and to initiate a conference call involving each of the identified contacts using the necessary procedure. For example, the user terminal may transmit a conference call request packet to each of the contacts via the network. The packet may contain information including an identification that the conference call relates to a game, the identity of the game, the identity of the user requesting the conference call, the identity of the selected characters and selected contacts and mapping information indicating which contact is associated with each game character. It is understood that the conference call may be in the form of audio, video or both audio and video communication.

Each requested contact's games console uses the received packet to display an appropriate request, which may be accepted or declined. In one embodiment, the requested contact's console first performs a check to determine whether the appropriate game application software is available. If not, the console may automatically decline the request or indicate to the requested contact that the appropriate application must be available before the request can be accepted. If the request is accepted then an appropriate request signal is transmitted over the network back to the requesting party. Once the request has been accepted, the game application is launched on the requested party's game console and a connection is established between the requesting party's console and the requested contact's console.

When the INVITE request is accepted, connections are set up between the consoles that have accepted the INVITE request and the console that transmitted the INVITE request. Conference call data and game control signaling may then be transmitted between the games consoles via the established connections. The console that transmitted the INVITE requests is the master console that hosts the conference call and to applies the game logic during play. The game may then be played by each of the players over the network under the control of the master, with each of the other game consoles providing player input and call data such as audio or video streams to the master console the during the game.

The conference call set up according to the process described above results in the production of one or more data streams being transmitted to the host console, for example in the form of video and/or audio streams. The audio streams may represent the speech of the various game players and the video streams may represent video images of the players taken by web cameras connected to each game console. Individual data streams are generated by each player's console and are transmitted over the network to the master.

For audio streams the host console is arranged to mix selected audio streams to produce a mixed stream which is then transmitted to each of the consoles participating in the game. The mixed stream comprises a superposition of the selected audio streams so that the sounds from each individual stream can be heard simultaneously in the mixed stream.

In the case of the video stream, the host console is arranged to transmit at least one of the received video streams to each of consoles participating in the game. In the case where more than one video stream is transmitted to each participant console, each received video stream is decoded separately and output to separate areas of the game console display such as the television 100.

In an embodiment of the invention, the selection of the data streams to be output is performed in dependence on factors including the current state of the game, the game logic and game inputs and outputs. For example, the selection of the streams may be performed so as to temporarily exclude from selection the data streams from one or more of the players.

In one example, the data stream of only one of the players may be selected, the data streams of the other players being temporarily excluded. For example, in a quiz game, if player A inputs a selection signal to select a 'buzzer' in response to being asked a question, before players B and C are able to input corresponding selection signals, in this case only the audio stream of player A is selected to be output at each of the game consoles. This enables player A to speak without the sound of the other players being heard. In the case where voice recognition software is used to interpret the answer provided by player A this reduces the chances of an error in the voice recognition caused by the other players speaking.

Once the question has been answered, the stream processing may return to a normal state in which all streams are included in the mixed stream.

In the above example of a quiz game, when the master game console receives inputs representing the key presses of the players, the game application executed on the master console determines which player was the first to press the buzzer. The games console then transmits this information to the communication client which then excludes all data stream from the final mixed stream except for the player determined by the game logic as the one who pressed the buzzer first. When the game logic determines that the question has been answered, the game console transmits signal to the user terminal instructing the user terminal to return to normal processing of the data streams so that all of the data streams are include in the mixed stream.

In another example, a karaoke game gives players turns to sing in a karaoke contest. Once each player has sung a song, the players are given the opportunity to vote on each others performances. The game logic may specify that the player with the most votes is able to sing an encore. The game logic transmits control signals to the user terminal resulting in the data streams of all but the player with the most votes to be excluded from the mixed stream during the last song. This enables the winning player to sing without disturbance from the others.

While various embodiments of the invention have been described, the skilled person will appreciate that further modifications are possible and that the invention is not limited to the specific examples given above.

The invention claimed is:

1. A method for outputting video streams in a communication system, the method comprising the steps of:
   executing an electronic game application at a user terminal, the game application being programmed to allow two or more users of the communication system to participate in the game;
   receiving two or more video streams at the user terminal, each video stream being generated by a user of the communications system participating in the game;
   applying game logic to determine the current state of the game application; and
   selecting one or more of the received video streams to be output from an output device of the user terminal, wherein the selection is implemented at the user terminal and depends on the current state of the game application.

2. A method according to claim 1 in which the game application is a quiz game.

3. A method according to claim 2 in which the step of applying game logic includes the step of determining which user has reacted most quickly to a question being asked.

4. A method according to claim 3 in which the selected video stream comprises only the video stream generated by the user who reacted most quickly to the question.

5. A method according to claim 1 in which the game application is a karaoke competition.

6. A method according to claim 5 in which the step of applying game logic includes the step of determining which user has received the most votes in a voting process.

7. A method according to claim 6 in which the output mixed stream comprises only the video stream generated by the user who has obtained the most votes.

8. A method according to claim 1 in which the two or more users participate in the game remotely over a network.

9. A method according to claim 1 in which the communication system is a VoIP network.

10. A computer program comprising computer executable instructions, which, when executed by a processor, causes the processor to perform the method of claim 1.

11. A system for outputting video streams in a communication system, the system comprising:
    a processor for executing an electronic game application at a user terminal, the game application being programmed to allow two or more users of the communication system to participate in the game;
    an input for receiving two or more video streams at the user terminal, each video stream being generated by a user of the communications system;
    means for applying game logic to determine the current state of the game application; and
    means at the user terminal for selecting one or more of the received video streams to be output from an output device of the user terminal, wherein the selection depends on the current state of the game application.

* * * * *